C. S. JOHNSTON.
SECTIONAL WHEEL RIM.
APPLICATION FILED MAY 5, 1915.
1,180,724.
Patented Apr. 25, 1916.
3 SHEETS—SHEET 1.
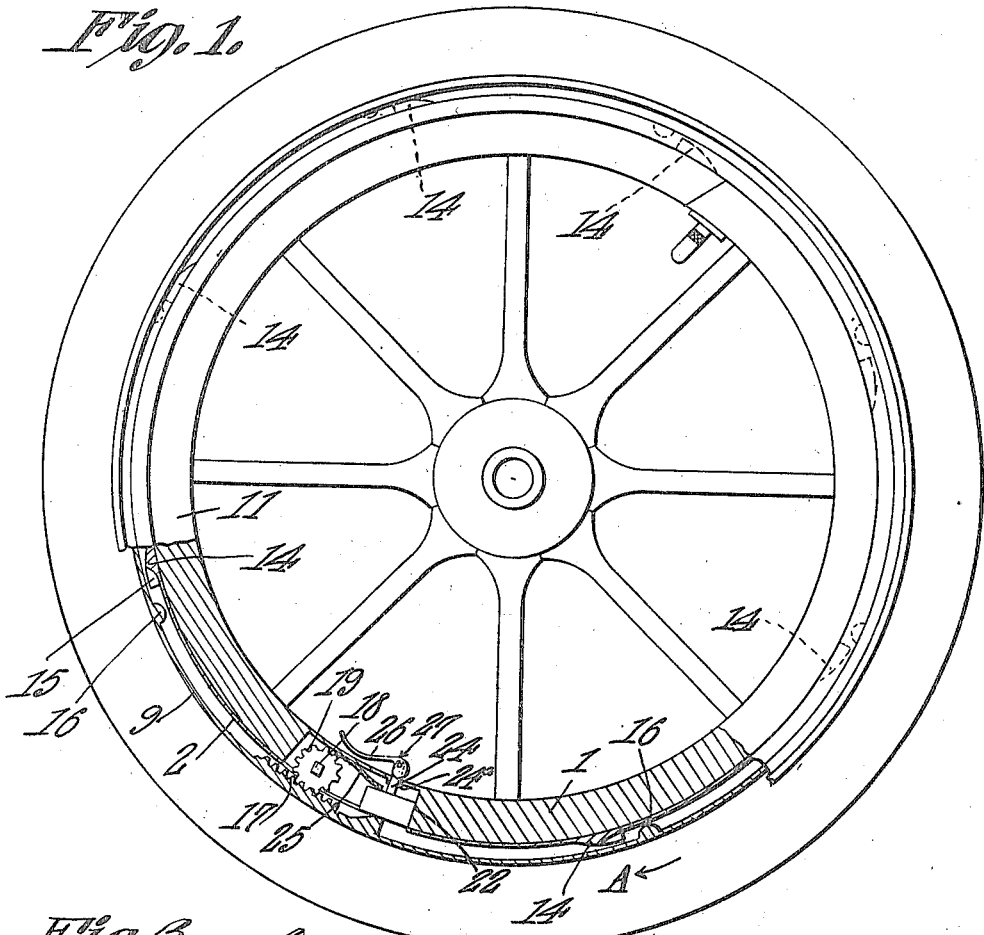
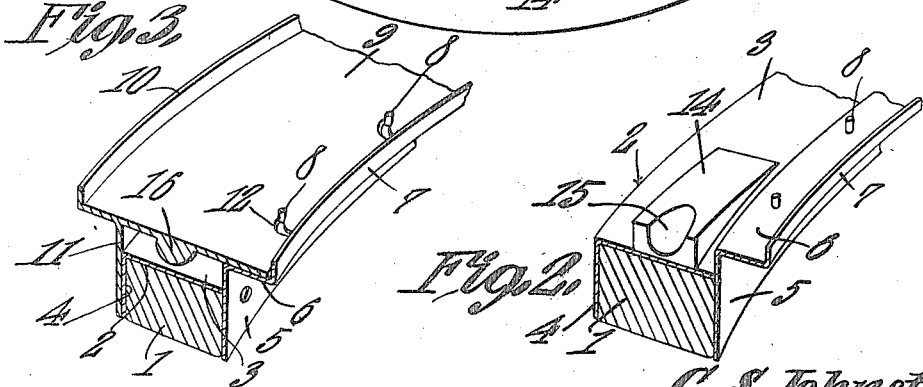
Witnesses
J. R. Timlin
R. L. Parker
C. S. Johnston,
Inventor
by C. A. Snow & Co.
Attorneys

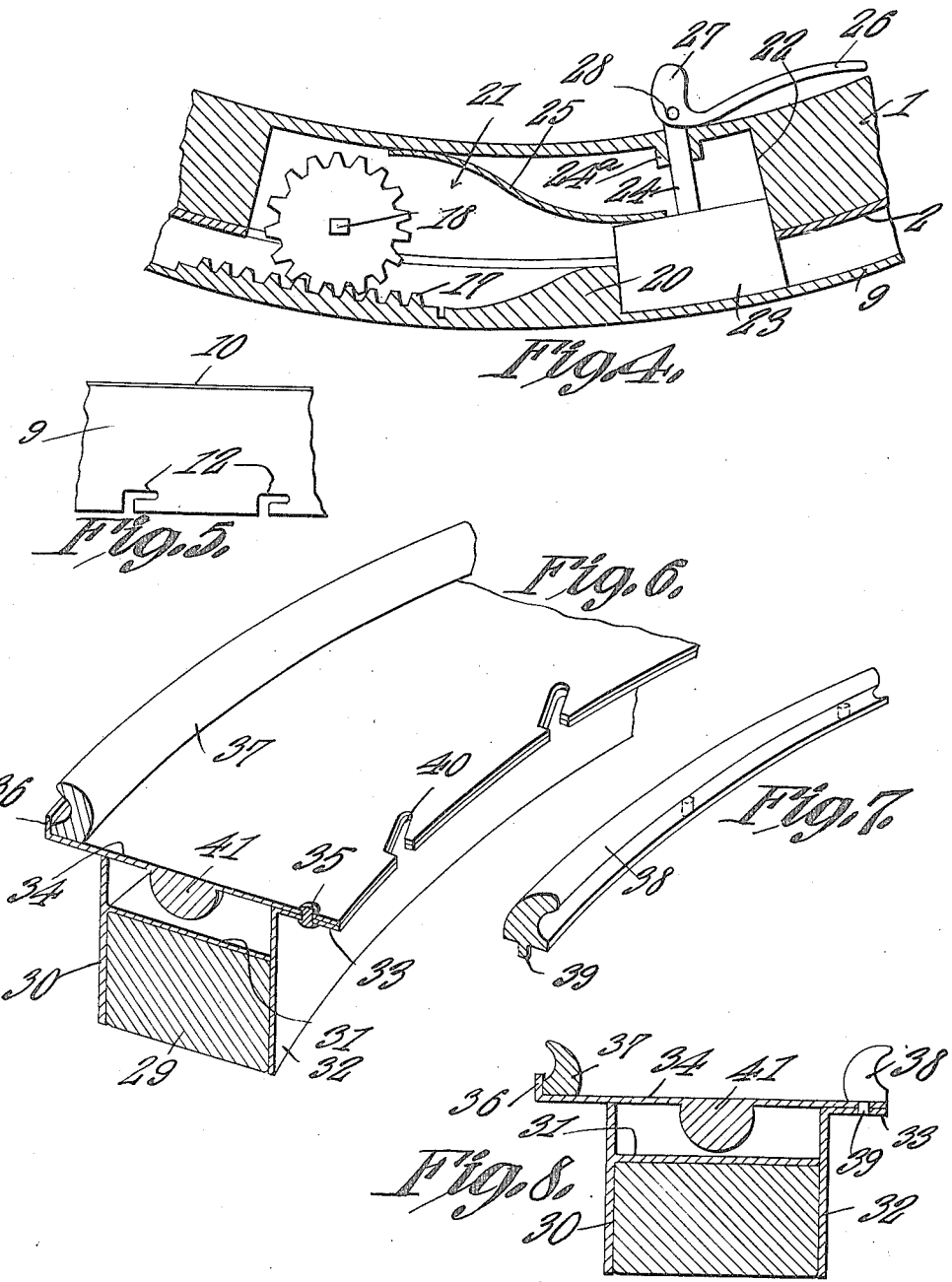

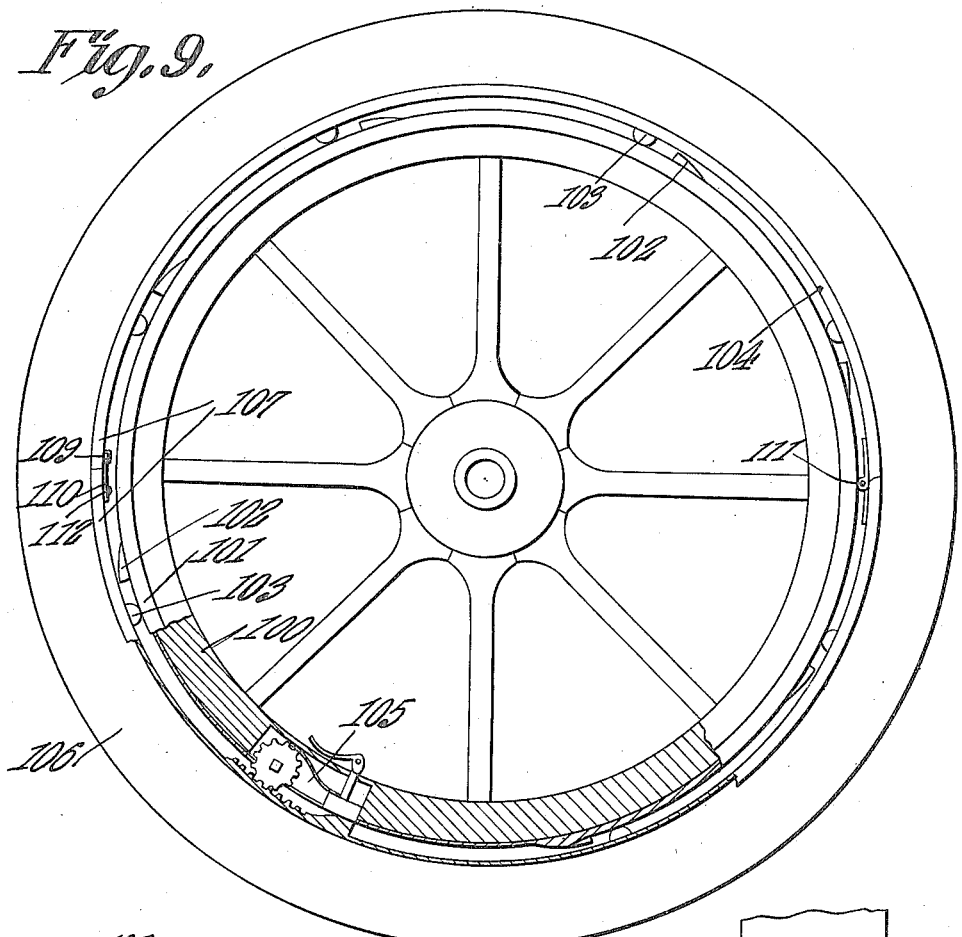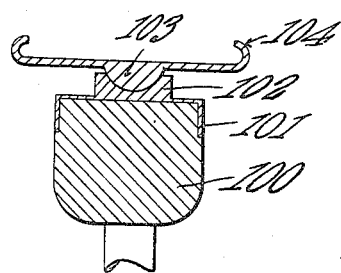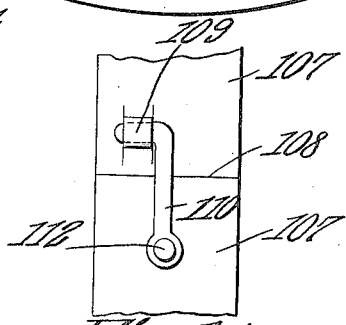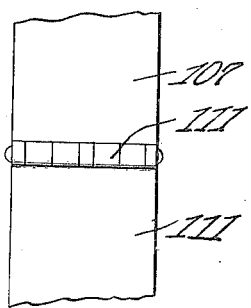

UNITED STATES PATENT OFFICE.

CLARENCE S. JOHNSTON, OF GLENDIVE, MONTANA.

SECTIONAL WHEEL-RIM.

1,180,724.　　　　　Specification of Letters Patent.　　Patented Apr. 25, 1916.

Application filed May 5, 1915. Serial No. 26,006.

*To all whom it may concern:*

Be it known that I, CLARENCE S. JOHNSTON, a citizen of the United States, residing at Glendive, in the county of Dawson and State of Montana, have invented a new and useful Sectional Wheel-Rim, of which the following is a specification.

The device forming the subject matter of this application is a rim for vehicle wheels and one object of the present invention is to provide novel means whereby relative movement may be produced between circumferential parts of the rim, thereby to lock the said parts against further movement.

The invention aims to improve the means whereby the rim parts are locked against relative circumferential movement, and to improve the means whereby, at the will of an operator, relative movement between the parts of the rim may be brought about.

It is within the scope of the invention to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—Figure 1 shows the invention in side elevation, parts being broken away and sectioned; Fig. 2 is a fragmental perspective of the felly and parts carried thereby; Fig. 3 is a fragmental perspective showing the felly and the rim assembled; Fig. 4 is a vertical sectional detail showing the actuating mechanism and one of the locking devices; Fig. 5 is a fragmental plan of the rim; Fig. 6 is a fragmental perspective showing a modified form of the invention; Fig. 7 is a detailed perspective showing one of the tire rings employed in connection with that form of the invention which is depicted in Fig. 6; Fig. 8 is a transverse section of the complete structure formed by assembling the elements shown in Figs. 7 and 6. Fig. 9 is a side elevation showing a modified form of the invention, parts being broken away; Fig. 10 is a cross section of the structure shown in Fig. 9; Fig. 11 is a fragmental elevation showing a portion of the rim; Fig. 12 is a fragmental elevation showing a portion of the rim; Fig. 10ª is a transverse section illustrating a slight modification in the structure delineated in Fig. 10.

In the drawings there is shown a felly 1 to which is secured an annular band 2 which in cross section is L-shaped, the band 2 comprising a peripheral flange 3 and a side flange 3 and a side flange 4. A fixed side plate 5 is attached to the edge of the felly 1 opposite to the flange 4 of the band 2 and is provided with a laterally projecting, outstanding ledge 6 terminating in an upstanding lip 7. Fixed to and upstanding from the ledge 6 are projections 8 in the form of pins, and of these projections or pins there may be any number.

The invention comprises an annular rim section denoted by the numeral 9 and provided along one edge with a lip 10 adapted to coöperate with the lip 7. Those skilled in the art will understand that the lips 7 and 10 may be of any desired form, depending upon the sort of tire which is to be retained. The part 9 is provided with a rectangularly disposed flange 11 which coöperates with the flange 4 of the annular band 2 on the felly 1. In the edge of the part 9 are formed L-shaped slots 12 adapted to receive the pins 8 on the ledge 6.

At intervals about the periphery of the wheel, the flange 3 of the band 2 is provided with inclined shoulders 14 in the ends of which concaved recesses 15 are formed. These recesses 15 under circumstances which will be pointed out hereinafter are adapted to coöperate with and receive bosses 16, preferably of semispherical form and fashioned upon or secured to the part 9.

A means is provided for producing relative circumferential movement between the parts 3 and 9, to the end that the bosses 16 may engage with the seats 15. This means preferably includes a rack 17 extended circumferentially of the wheel and carried by the part 9. Journaled for rotation in the fixed side plate 5 and accessible from the exterior of the side plate is a shaft 18 carrying a pinion 19 meshing into the rack 17 and located in a recess 21 formed in the felly 1. The part 9 is equipped with a stop 20 adapted to coact with a latch block 23 slidable radially of the wheel in contact with a shoulder 22 defined in the felly 1 by one wall of the recess 21. The latch block 23 is equipped with a stem 24 passing slidably through a thimble 24ª projecting into the recess 21 from the felly 1. A spring of any desired form, in the present instance shown in the form of a leaf 25 is secured at one end to the felly 1 and bears against the latch block 23 so as to force the same outwardly in a radial direction. The invention comprises an external lever 26 provided with a cam 27 adapted to bear upon the inner curve of the felly 1, the lever being connected with the stem 24 of the latch block 23 by means of a pivot element 28.

Let it be supposed that the parts are relatively arranged as shown in Fig. 1. Under such circumstances, the operation of the device is as follows:—When the shaft 18 is rotated manually, the pinion 19 is rotated and the latter meshing into the rack 17 moves the part 9 circumferentially as indicated by the arrow A in Fig. 1. By this operation, the bosses 16 on the part 9 come into registration with the seats 15 in the shoulders 14 on the flange 3 of the annular band 2, and thus relative circumferential movement between the wheel parts in one direction is prevented.

The latch block 23 may be elevated by means of the cam lever 26, as shown in Fig. 1 and, after the part 9 has been moved a sufficient distance in the direction of the arrow A, the lever 26 may be swung over into the position shown in Fig. 4 of the drawings, the latch block coöperating with the stop 20 as clearly shown in Fig. 4. Noting the function of the latch block 23 and recalling the manner in which the bosses 16 coöperate with the seats 15 in the shoulders 14, it will be obvious that the part 9 cannot now move circumferentially in either direction.

Assuming that the cam lever 26 is in the position shown in Fig. 4 at the time that the part 9 is moved in the direction of the arrow A, it will be obvious that the latch block 23 will first ride up along the inclined face of the stop 20 and then drop behind the stop 20 as shown in Fig. 4, under the action of the spring 25.

Passing to the modified form of invention delineated in Figs. 6, 7 and 8, the felly is shown at 29 and carries a fixed side plate 30 provided with a circumferential rim band 31. A movable side plate 32 is shown, the same having a lateral flange 33 secured to an annular rim section 34 by means of rivets 35 or in any other suitable manner. Along one edge of the part 34 there is a flange 36 adapted to coact with a tire ring 37 of any desired sort. The opposite tire ring is shown at 38 and is provided with studs or projections 39 adapted to be received in slots 40 formed in the flange 33 and in one edge of the part 34, the slots 40 extending transversely into the edge of the parts 33 and 34 and then extending in a substantially circumferential direction.

It will be understood that in connection with the form shown in Figs. 6, 7 and 8, the means hereinbefore described for producing and controlling relative circumferential movement between the parts of the structure are employed. Thus, the part 34 is shown as provided with a boss 41 having the functions of the boss 16 and adapted to coact with a mechanism like that with which the boss 16 coöperates.

In order to assemble the part 9 with the felly 1, the rim is pushed transversely of the felly until the pins 8 enter the slots 12. When a circumferential movement between the part 9 and the felly takes place, the pins 8 move into the circumferential portions of the slots 12.

In that form of the invention delineated in Figs. 9, 10, 11 and 12, the felly is shown at 100 and carries a felly band 101 having inclined shoulders 102 adapted to coöperate with bosses 103 formed on a rim denoted generally by the numeral 104, the coöperation between the shoulders and the bosses being as hereinbefore described. At 105 is located the mechanism shown in Fig. 4. The tire is shown at 106. The rim 104 comprises approximately semi-circular parts 107 united as shown in Fig. 12 by a hinge 111. The ends 108 of these parts 107 are provided, respectively with an eye 109 and with a hook 110 adapted to coöperate with the eye, the hook being pivotally mounted as shown at 112. The hinge 111 forms a somewhat loose connection between the parts 107 of the rim 104 and when the hook 110 is detached from the eye 109, the ends 108 of the rim parts 107 may be swung inwardly or outwardly. It is thus possible to swing the ends 107 of the rim parts outwardly, thereby to cause the same to engage with the inner edge of the tire 106, the hook 110 being subsequently engaged with the eye 109 and the tire and the rim being slipped transversely on the felly 100.

Although in Fig. 10 of the drawings, the rim has been shown as provided with clencher flanges, it will be understood that any suitable tire holding means may be provided without jeopardizing the utility of the invention.

The clencher form of rim indicated in Fig. 10 is not mandatory. As shown in Fig. 10ª, the rim appears at 361 and may be provided with flanges 362 adapted to receive side rings (not shown) for holding the tire in place.

Having thus described the invention, what is claimed is:—

In a device of the class described, a felly having a recess; a rim section extended longitudinally of the felly; a rack on the rim section and located opposite to the recess; a pinion journaled in the felly and located in the recess and meshing into the rack; a stop carried by the rim section and including an inclined face and a shoulder; a latch in slidable contact with the felly at one end of the recess and engaged with the shoulder, the latch being adapted to ride up along the inclined face of the stop and to interlock with the shoulder upon relative movement between the rim section and the felly; spring means for moving the latch outwardly to engage with the shoulder; mechanism assembled with the latch for drawing the latch inwardly against the action of the spring means; a projection on the rim section, and a projection carried by the felly, one projection having a terminal recess receiving the other projection to limit the relative circumferential movement between the rim section and the felly.

In testimony that I claim the foregoing as my own, I have hereto affixed my signature in the presence of two witnesses.

CLARENCE S. JOHNSTON.

Witnesses:
C. E. WARD,
J. P. SCHAEFFER.